(12) United States Patent
Ruhlander et al.

(10) Patent No.: US 8,141,454 B2
(45) Date of Patent: Mar. 27, 2012

(54) CABLE ASSEMBLY WITH RETAINER

(75) Inventors: Gregory P. Ruhlander, Hannibal, MO (US); Donald G. Gordy, Moberly, MO (US)

(73) Assignee: Dura Automotive Systems, LLC, Auburn Hills, MI (US)

( * ) Notice: Subject to any disclaimer, the term of this patent is extended or adjusted under 35 U.S.C. 154(b) by 138 days.

(21) Appl. No.: 12/333,985

(22) Filed: Dec. 12, 2008

(65) Prior Publication Data
US 2010/0147100 A1    Jun. 17, 2010

(51) Int. Cl.
*F16C 1/26* (2006.01)
(52) U.S. Cl. ...................................................... 74/502.6
(58) Field of Classification Search ................. 74/500.5, 74/502.2, 502.4, 503, 502.6; 403/326, 327; 248/65
See application file for complete search history.

(56) References Cited

U.S. PATENT DOCUMENTS

| | | | | |
|---|---|---|---|---|
| 4,157,799 A | * | 6/1979 | Simon | 248/56 |
| 4,581,953 A | * | 4/1986 | Walston et al. | 74/502.4 |
| 4,625,579 A | * | 12/1986 | Spease | 74/502.4 |
| 4,694,705 A | * | 9/1987 | Frankhouse et al. | 74/500.5 |
| 4,947,704 A | | 8/1990 | Gokee | |
| 5,241,879 A | * | 9/1993 | Kelley | 74/502.4 |
| 6,189,407 B1 | | 2/2001 | Champ et al. | |
| 7,226,234 B2 | | 6/2007 | Gordy et al. | |
| 2003/0223805 A1 | * | 12/2003 | Ruhlander | 403/122 |
| 2005/0186024 A1 | | 8/2005 | Ruhlander | |
| 2006/0039748 A1 | | 2/2006 | Ruhlander | |
| 2008/0196531 A1 | | 8/2008 | Ruhlander | |
| 2009/0056494 A1 | | 3/2009 | Gordy et al. | |

FOREIGN PATENT DOCUMENTS

| | | |
|---|---|---|
| EP | 1469209 A2 | 10/2004 |
| KR | 1020080003579 | 1/2008 |

OTHER PUBLICATIONS

Written Opinion & International Search Report for PCT/US09/67638, mailed Jul. 13, 2010, 7 pages.

\* cited by examiner

*Primary Examiner* — Vicky Johnson
(74) *Attorney, Agent, or Firm* — Reising Ethington P.C.; Matthew J. Schmidt; Dean B. Watson

(57) ABSTRACT

A cable assembly may include a cable, a connector and a retainer coupled to the connector. The connector may be carried by the cable and include a reduced diameter portion and a head extending from the reduced diameter portion with at least a portion that is larger than the reduced diameter portion. The retainer may be coupled to the connector and include a body with a cavity and a tip that defines an opening leading to the cavity. In assembly, the head is received within the cavity with the reduced diameter portion extending out of the cavity and into the opening. The opening is noncircular and has a minimum diameter that is smaller than at least the largest diameter portion of the head so that at least a portion of the tip radially overlaps the largest diameter portion of the head to retain the head within the cavity.

6 Claims, 6 Drawing Sheets

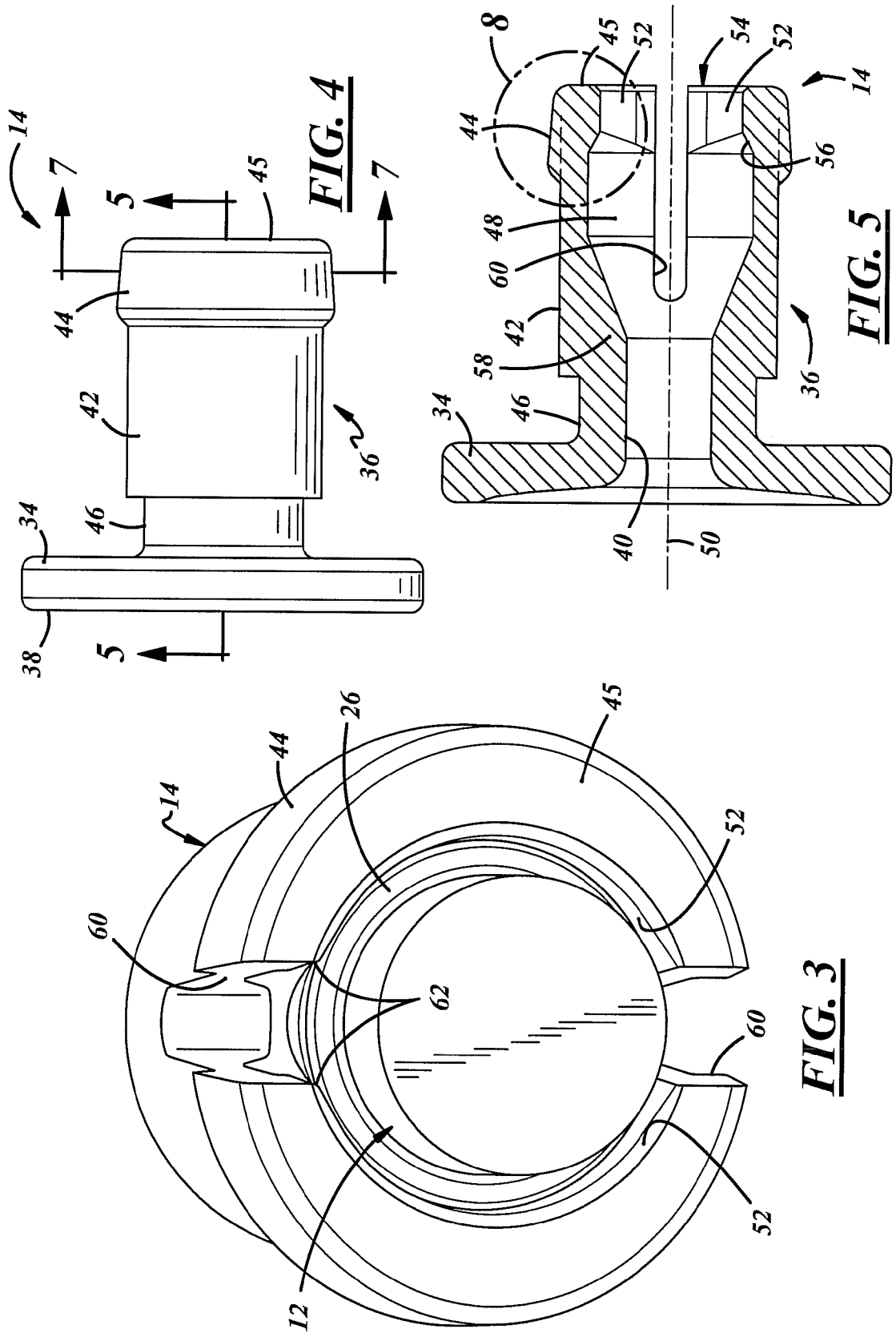

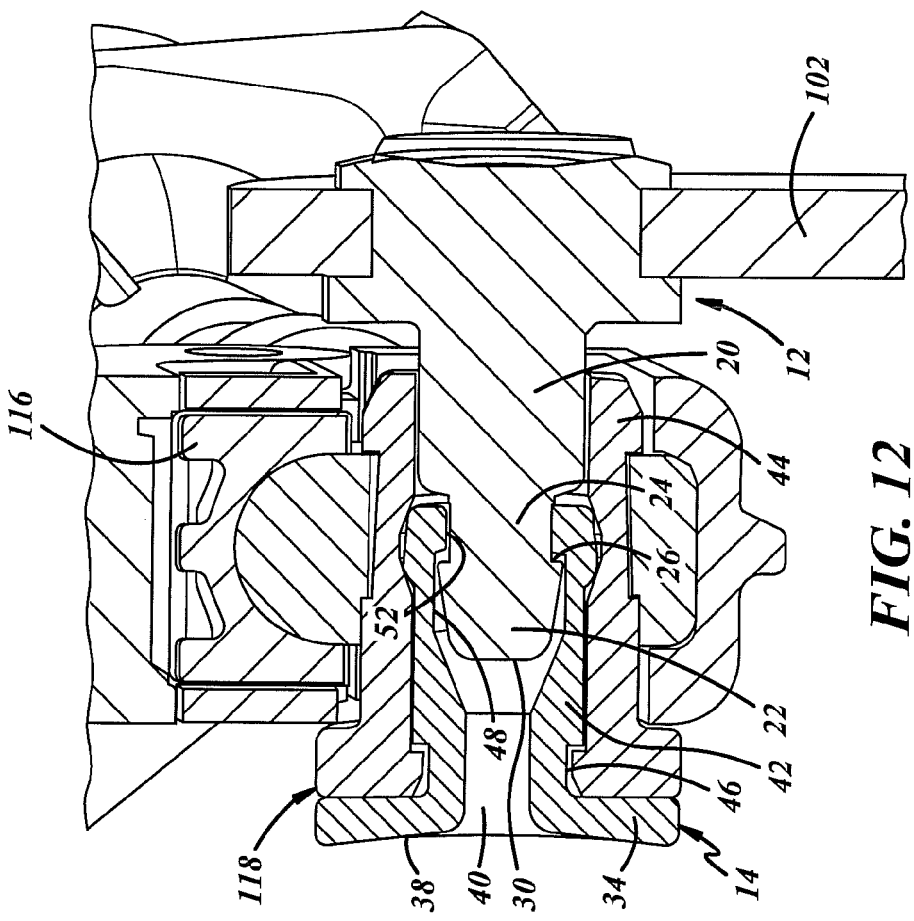
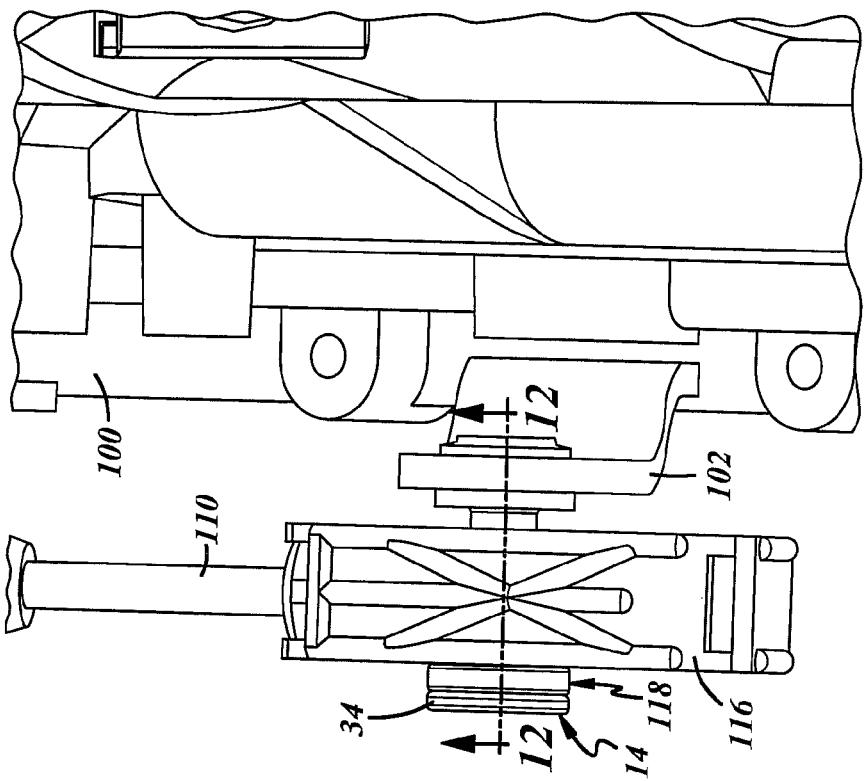
FIG. 12
FIG. 11

CABLE ASSEMBLY WITH RETAINER

TECHNICAL FIELD

The present disclosure relates generally to a cable assembly and more particularly to a cable with a retainer.

BACKGROUND OF THE DISCLOSURE

Motion-transmitting remote control cable assemblies, sometimes referred to as "Bowden cables" or "push-pull cables," are used for transmitting both force and travel along a curved path in aircraft, automotive, and marine environments. Known cable assemblies can be used for transmitting load and motion in push, pull and/or rotary type applications. In the automotive environment, typical applications include but are not limited to parking brakes, accelerators, hood releases, brake releases, trunk releases, seat controls, park lock, tilt wheel controls, fuel filler doors, transmission shifter cables, powered actuators, and hydraulic control cables.

A motion-transmitting remote control cable assembly for transmitting motion along a curved path typically includes a flexible core element slidably enclosed within a flexible outer sheath (conduit) with end fittings attached to both ends of each respective member. These fittings attach and react to load from the conduit to its mounting points and from the core element to its mounting points. The core element is adapted at one end to be attached to a member to be controlled whereas the other end is attached to an actuator for moving the core element within the outer sheath. The outer sheath is adapted to be secured by the fittings to a support structure.

SUMMARY OF THE DISCLOSURE

A cable assembly may include a cable, a connector and a retainer coupled to the connector. The connector may be carried by the cable and include a reduced diameter portion and a head extending from the reduced diameter portion and having at least a portion that is larger in diameter than the reduced diameter portion. The retainer may be coupled to the connector and include a body with a cavity and a tip that defines an opening leading to the cavity. In assembly, the head is received within the cavity with the reduced diameter portion extending out of the cavity and into the opening. The opening is noncircular and has a minimum diameter that is smaller than at least the largest diameter portion of the head so that at least a portion of the tip radially overlaps the largest diameter portion of the head to retain the head within the cavity.

A cable assembly may include a cable including a fitting adapted to be connected to a component to couple the cable to the component and a retainer releasably coupled to the fitting. The retainer may include a body with a cavity and a tip that defines an opening leading to the cavity. And the retainer may be constructed and arranged to mate with a connector associated with the component and having a reduced diameter portion and a head extending from the reduced diameter portion with at least a portion that is larger in diameter than the reduced diameter portion. The retainer may be adapted to receive the head within the cavity with the reduced diameter portion extending out of the cavity and into the opening. Further, the opening may be noncircular and have a minimum diameter that is smaller than at least the largest diameter portion of the head so that, when the head is received within the cavity, at least a portion of the tip radially overlaps the largest diameter portion of the head to retain the head within the cavity. In one implementation, the cable assembly is used in a transmission shifter assembly and the connector is a pin or other member of a transmission control. The cable fitting may be disposed on or over the connector and the retainer may be pressed onto the connector to hold the fitting on the connector.

BRIEF DESCRIPTION OF THE DRAWINGS

The following detailed description of preferred implementations and best mode will be set forth with regard to the accompanying drawings, in which:

FIG. 3 is a perspective view of the retainer and connector;

FIG. 4 is a side view of the retainer;

FIG. 5 is a sectional view taken along line 5-5 of FIG. 4;

FIG. 11 is a side view of an adjuster and end connection assembly of the cable assembly; and FIG. 12 is a cross-sectional view of the cable assembly and associated components taken along line 12-12 of FIG. 11.

DETAILED DESCRIPTION OF PREFERRED EMBODIMENTS

Figure 1:
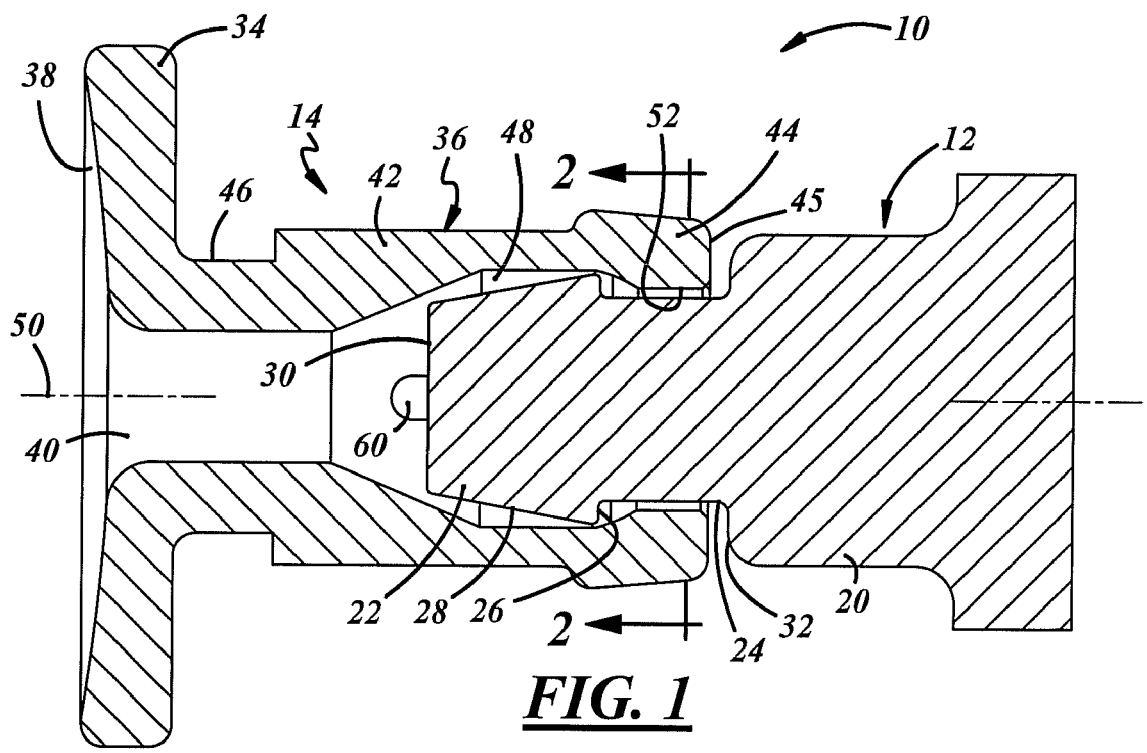
FIG. 1 is a cross sectional view of one embodiment of a retainer disposed on a tapered pin connector of a cable assembly.
Figure 2:
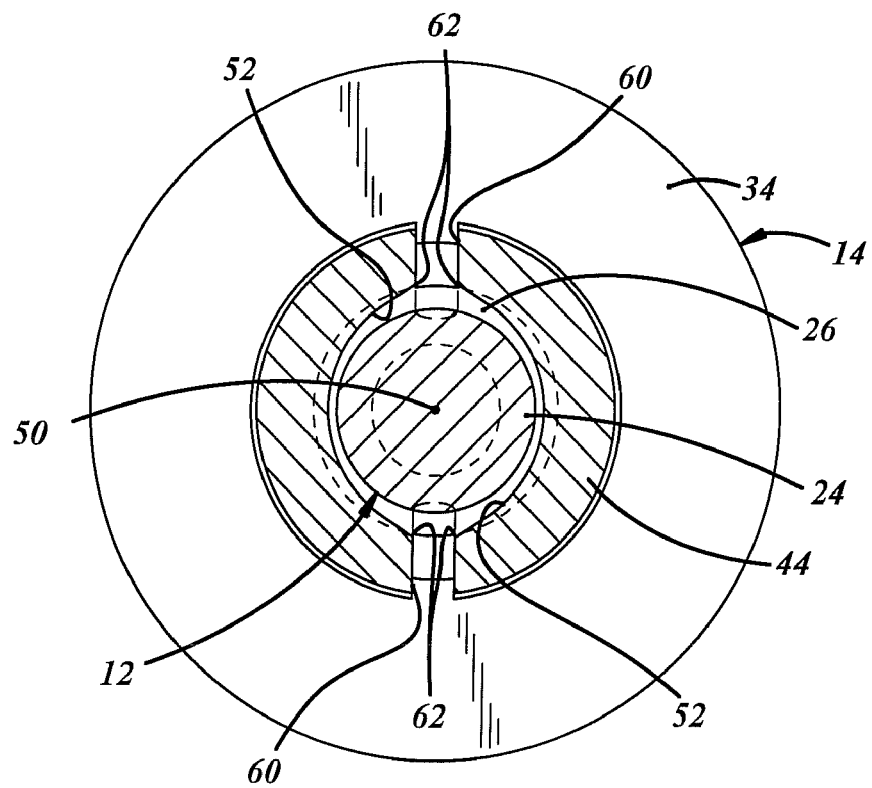
FIG. 2 is a cross sectional view of the retainer and connector taken along line 2-2 in FIG. 1.

Referring in more detail to the drawings, FIGS. 1-3 illustrate a cable assembly 10 including a cable 11, and a retainer 14 adapted to couple the cable assembly to a connector 12 which may be associated with another component. For example, as shown in FIGS. 9-12, the cable assembly 10 may be used in a transmission shifter application for a vehicle transmission 100. The connector 12 may be a control pin or the like associated with a shift control arm 102 of the transmission 100. The retainer 14 may be used to couple the cable assembly 10 to the connector 12 and thereby connect the cable 11 to the transmission 100.

In such an application, the cable 11 may be coupled at one end to a shift lever 104 in a passenger compartment of the vehicle and at its other end to a mounting bracket 106 that may be carried by the transmission 100. The cable 11 may include an inner core element (not shown) and an outer sheath or conduit 108. The core element may be coupled to a rod 110 through a swivel tube 112 or the like as is known in the art. The conduit may be coupled to an end fitting 114 that in turn is coupled to the mounting bracket 106. The rod 110 may be coupled to a fitting 116 that is coupled to the control arm 102 by the connector 12, to connect the rod 110 and core element to the control arm. The fitting 116 may permit lengthwise adjustment of the core/rod relative to the control arm in assembly. The retainer 14 may be coupled to the connector 12 after the fitting is disposed on or over the connector 12 to prevent unintended removal of the fitting 116 from the control arm 102. As best shown in FIG. 12, an isolator 118 carried by the fitting 116 may be disposed over the connector 12 before the retainer is coupled to the connector. In this manner, movement of the shift lever 104 by an operator of the vehicle moves the core element, rod 110 and control arm 102 to, for example, shift the transmission 100 from park to a drive gear. The cable assembly 10 could also be used in any other suitable application, including by way of examples without limitation, parking brakes, accelerators, hood releases, brake releases, trunk releases, seat controls, park lock, tilt wheel controls, fuel filler doors, transmission shifter cables, powered actuators, and hydraulic control cables.

As shown in FIG. 1, the connector 12 may include a body 20 which may be carried by or attached to and extending from the cable 11. The body 20 may include a head 22 extending from a reduced diameter neck 24 defining an outwardly extending and circumferentially continuous flange 26. The head 22 may be generally frusto-conically (i.e. frustum) shaped with a tapered outer surface 28 which may have its maximum diameter adjacent to the flange 26 and extend to its minimum diameter at the free end 30 of the connector 12. At its other end, the neck 24 may lead to an outwardly extending shoulder 32 defining a stop surface.

The retainer 14 may be constructed and arranged to mate with the connector 12, and may be releasably connected thereto. As best shown in FIGS. 3-5, the retainer 14 may include a base flange 34 at a first end of the retainer 14 and a body 36 extending from the base flange 34. The base flange 34 may be circumferentially continuous and have a generally planar end face 38 which may provide a surface to facilitate application of force to the retainer 14 so that it may be fitted over the head 22 of the connector 12.

The body 36 may extend from the base flange 34 and may be generally cylindrical and annular defining a passage 40 that may extend through the retainer 14. The body 36 may include a mid-portion 42, a tip 44 at a free end 45 of the retainer 14, and a reduced outer diameter neck 46 between the mid-portion 42 and the flange 34. In the area of the mid-portion, the passage 40 may become enlarged to define an internal cavity 48 which may have a larger cross-sectional area than a portion of the passage that extends through the flange 34. Of course, other configurations and arrangements may be provided, as desired. The body 36 and flange 34 may have a central axis 50, and various portions of this disclosure may be defined in terms of that axis. More specifically, the term "radial" refers to a direction generally perpendicular to the central axis 50 (or another defined axis), axial refers to a direction generally parallel to the central axis (or another defined axis), and circumferential refers to a direction surrounding the central axis (or another defined axis).

The tip 44 may be relatively thick in the radial direction and may have both a larger outer diameter and smaller inner diameter than the adjacent mid-portion 42. The outer diameter of the tip 44 may be tapered relative to the central axis 50 of the retainer 14 and the free end 45 of the tip may have a smaller outer diameter than the rest of the tip. The enlarged outer diameter may engage an adjacent component, such as the isolator 118 (FIG. 12), to prevent unintended or undesired outward flexing of the tip 44 in assembly.

The tip 44 leads to the mid-portion 42 of the body 36 which, compared to the tip, may have a reduced outer diameter and a reduced inner diameter, if desired. In this manner, the tip 44 may include radially inwardly extending shoulders or barbs defining an inner surface 52 of the tip 44 that defines a minimum diameter or minimum effective size of an opening 54 leading to the cavity 48. A transition region 56 may be defined between the inner surface 52 of the tip 44 and the inner surface of the mid-portion 42. The transition region 56 may be tapered or inclined at an acute included angle less than 90 degrees relative to the central axis 50 of the retainer 14. To improve the rigidity and strength of the mid-portion 42, it may have a tapered inner surface providing a thicker portion 58 and a reduced inner diameter leading to the neck 46.

A minimum diameter defined by the inner surface 52 of the tip 44 may be smaller than a maximum diameter of an object to be received through the opening 54 and into the cavity 48. To permit the tip 44 to flex or expand so that it may receive a larger object, such as the head 22 of the connector 12, one or more slots 60 may be formed through the body 36. The slots 60 may extend to the free end 45, fully through the thickness of the tip 44 and may extend generally parallel to the central axis 50 of the retainer 14. The axial length of the slots 60 can be calibrated along with the shape, thickness and material of the body 36 to control the relative flexibility of the tip 44, and adjacent section of the mid-portion 42. As shown in FIGS. 2 and 3, two slots 60 may be provided and they may be generally diametrically opposed. In such a configuration, the slots 60 divide the tip 44 into two sections which may flex generally independently of each other, and may be displaced radially outwardly relative to each other. This also divides the inner surface 52 into two portions, although any number of inner surfaces may be deemed to collectively define the inner surface of the tip 44 and the opening 54.

As best shown in FIGS. 2, 3, 6 and 7, the opening 54 leads to the cavity 48 and may be noncircular. The noncircular shape of this opening 54 may be formed in numerous ways and have numerous shapes or configurations. Any number of tip sections could be provided, and/or the inner surfaces 52 could be provided by discrete tabs, projections or other structure(s). In one form, the opening 54 may be an oval or generally football shaped and may have a major diameter extending between the slots 60, and a minor diameter perpendicular to the major diameter. In this form, the inner surface 52 of each section of the tip 44 terminates at opposed corners 62 defined by the slots 60, with two corners 62 at each slot 60 and four corners in all.

Figure 7:
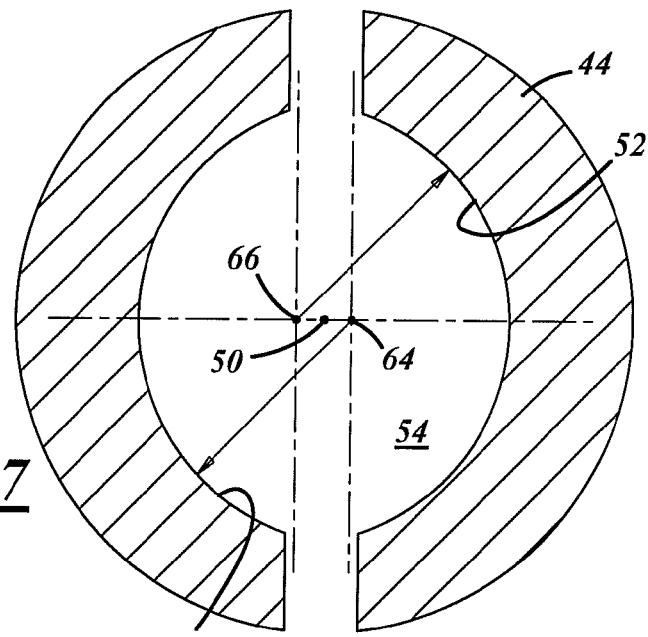
FIG. 7 is a sectional view taken along line 7-7 of FIG. 4.
Figure 8:
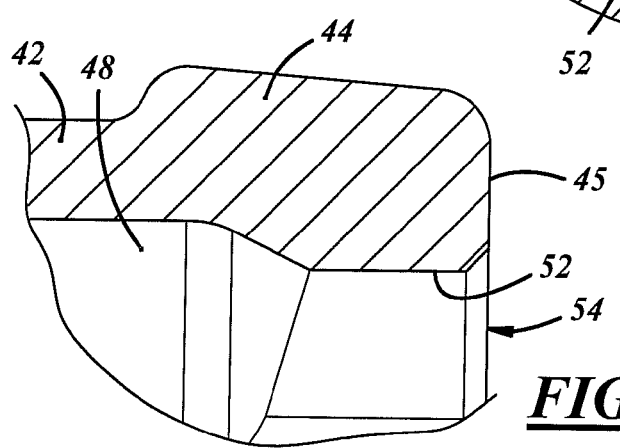
FIG. 8 is an enlarged fragmentary view of the encircled portion 8 in FIG. 5.
Figure 9:
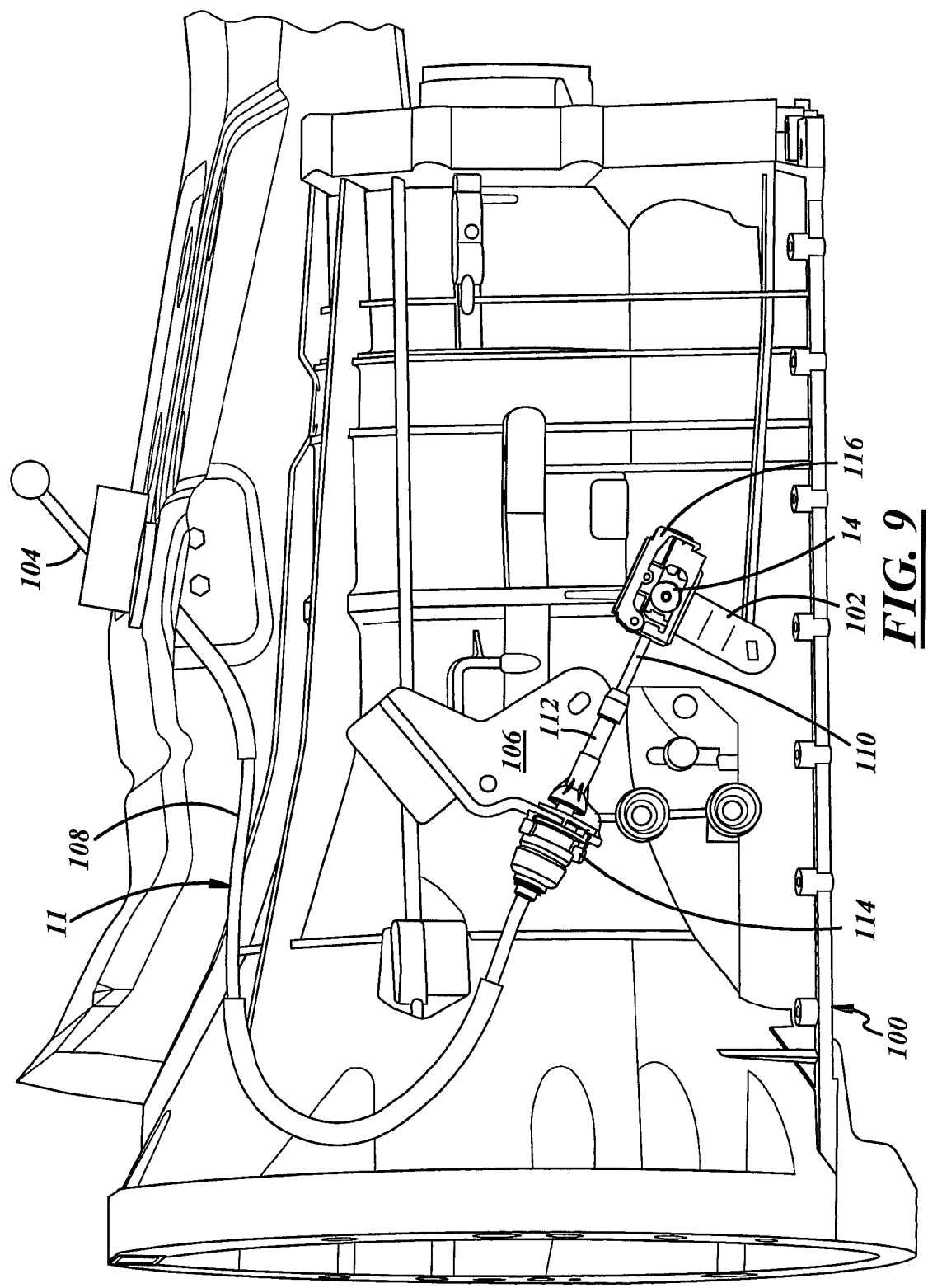
FIG. 9 is an overview of one implementation of a cable assembly used in a transmission shifter application.
Figure 10:
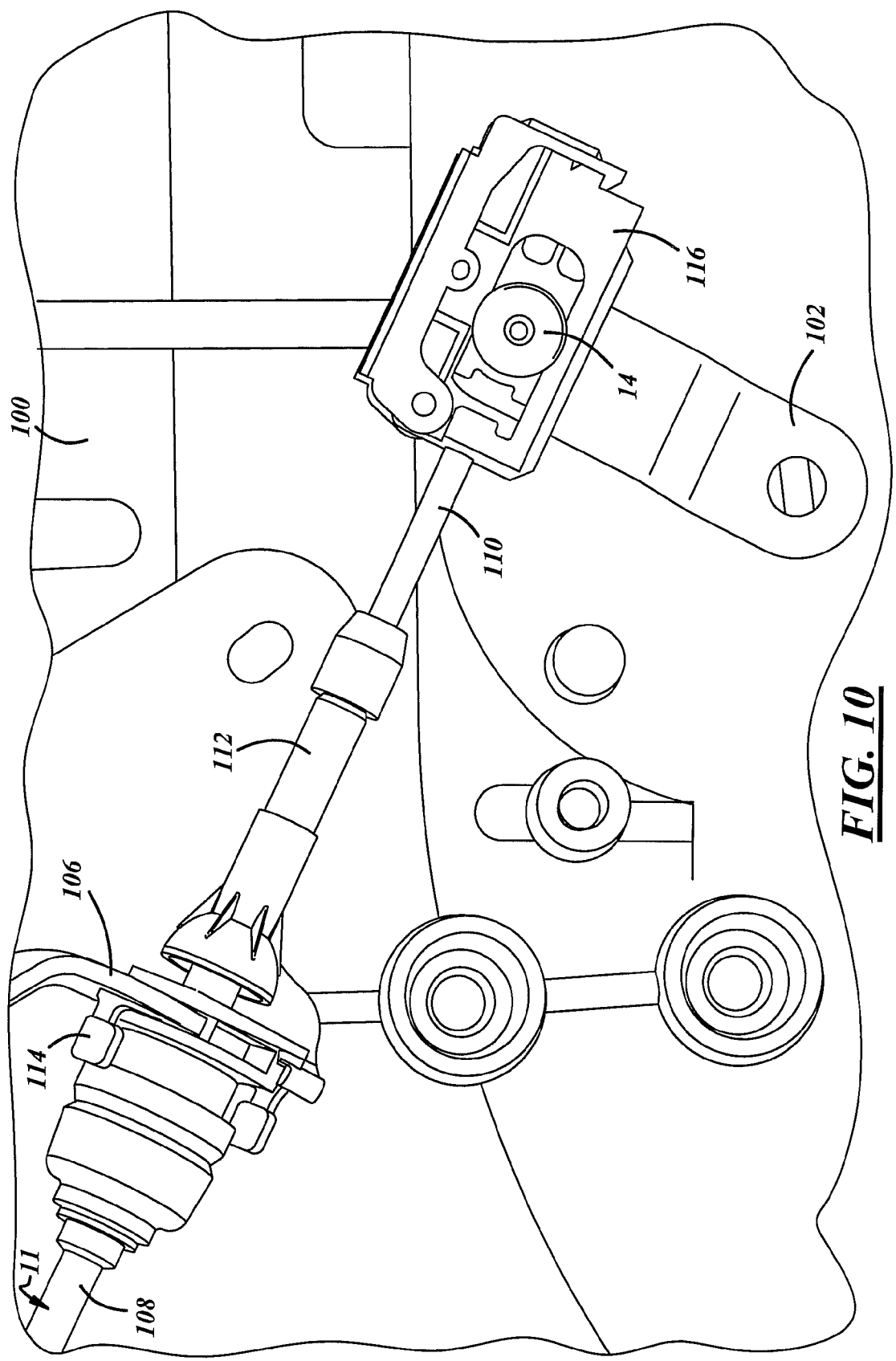
FIG. 10 is an enlarged view of a portion of FIG. 9 including a retainer and connector generally as shown in FIG. 1.

To achieve this or another noncircular shape, the opening 54 may be formed at least in part by providing the inner surfaces 52 of the two tip sections as portions of a circle or circles that are not coaxial (that is, the center axis 64 of one inner surface is offset from the center axis 66 of the other inner surface as shown in FIG. 7). In one form, the radius of curvature of each inner surface 52 may be the same, the axes 64, 66 of the inner surfaces 52 may be offset a like amount from the central axis 50 of the retainer, and the inner surfaces 52 may be mirror images of each other. Still further, the axis 64 of one inner surface 52 may be located between the central axis 50 and the other inner surface 52. In other words, the axis 64 of the inner surface 52 of one section of the tip 44 may be closer to the inner surface 52 of the other section of the tip 44. This may be true of one or more than one of the inner surfaces 52, and in the implementation shown, is true of the inner surfaces 52 of both sections of the tip 44.

Figure 6:
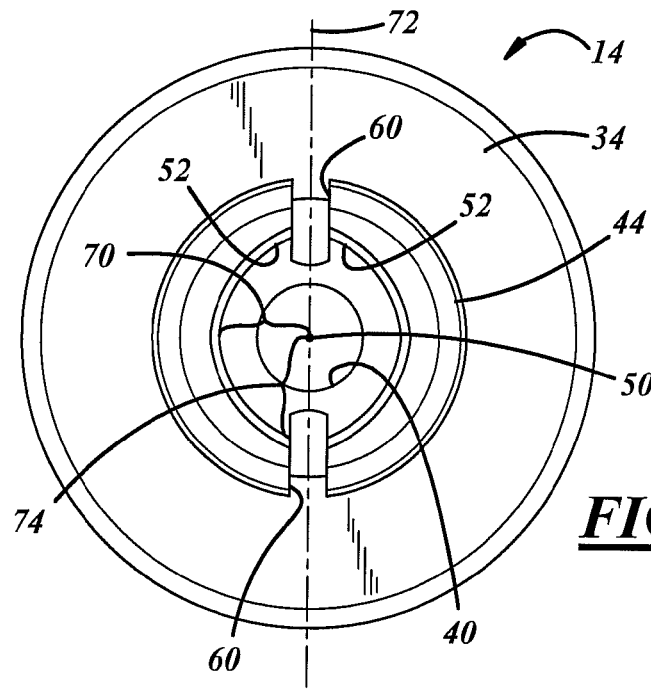
FIG. 6 is a plan view of the retainer.

The distance between one or more of the inner surfaces 52 and the central axis 50 of the retainer 14 may vary along the extent of one or more of the inner surfaces 52. In this manner, a minimum distance or diameter may be defined between one portion of an inner surface 52 and the central axis 50, and a maximum distance or diameter may be defined between a different portion of the same inner surface 52 and the central axis 50. The minimum and maximum distance could also be defined between the central axis 50 and portions of different inner surfaces 52. In other words, different diametrical lengths from the central axis 50 to the inner surfaces 52 are provided at least two different areas of the opening 54. As best shown in FIG. 6, the minimum distance 70 exists at the point perpendicular to a plane 72 bisecting the slots 60 and including the central axis 50, and the maximum distance 74 exists at each corner 62 of the inner surfaces 52.

In use, the opening 54 is aligned with the head 22 of the connector 12 and then the retainer 14 is pressed or otherwise disposed onto the connector 12 so that the head slides into and through the opening 54 until the flange 26 passes the inner surface 52 or barbs of the tip 44. The tip sections flex to permit the inner surfaces 52 of the tips 44 to move away from each other and permit the head 22 and its flange 26 to pass into the cavity 48. The cavity 48 may be sized to accommodate the flange 26 without any flexing of the tip sections, or the tip sections may remain somewhat flexed or expanded by the flange 26 even with the head 22 is fully received in the cavity 48. The resilient nature of the tip sections causes them to return to their unflexed state after the flange 26 passes the inner surfaces 52. In this state, inner surfaces 52 are disposed adjacent to the neck 24 and are axially spaced from and radially overlap the flange 26.

The extent of the radial overlap may vary along the extent of one or more of the inner surfaces 52 due to the noncircular shape of the opening 54 defined by the inner surfaces 52. In one implementation, at least one and preferably all of the corners 62 do not significantly overlap the flange 26 to limit or prevent damage to the corners 62 upon removal of the head 22 from the cavity 48. In a presently preferred implementation, the corners 62 do not radially overlap the flange 26 at all, as best shown in FIG. 2. This may facilitate repeated insertions and removal of the head 22 without damaging the retainer 14.

This may also reduce the total radial distance the tip sections must flex or travel to permit the flange 26 to pass through the opening 48. In at least some implementations, the radial distance the tip sections must flex is not more than about 175% of the maximum amount that the tip 44 (i.e. its barbs and inner surfaces 52) radially overlaps the flange 26, and, for example, may flex only about 100% to 150% of that distance. For example, if the maximum amount of overlap between the tip 44 and the flange 26 is 0.32 mm, each tip section would have to move radially outwardly between about 0.32 mm and 0.48 mm to permit the flange 26 to clear the inner surfaces 52. In at least one implementation wherein the corners 62 do not radially overlap the flange 26, each tip section would only have to move the same amount (or 100%) of the maximum overlap, which in this example is 0.32 mm. For purposes of comparison, if a circular opening were provided that is coaxial with the cavity 48, the corners 62 would overlap the flange 26 the same amount the rest of the inner surface 52 overlaps the flange 26. In that arrangement, each section of the tip 44 would have to travel a distance equal to at least twice (200%) the distance of the maximum amount of radial overlap to permit the corners 62 to clear the flange 26 and the head 22 to fully pass the opening 54. The reduced radial distance that the tip sections of a retainer 14 with a noncircular opening 54 have to be flexed to permit the head 22 to pass the inner surfaces 52 can reduce stresses on the body 36 when the head 22 is inserted into and removed from the cavity 48, and can reduce the force needed to insert the head 22 into the cavity 48 to facilitate assembly.

The force needed to install the head 22 into the cavity 48 may be about ½ to ⅙ of the force that is required to remove the head 22 from the cavity 48. One exemplary implementation requires about 30 to 40 Newtons to insert the head 22 into the cavity 48 and can prevent removal of the head 22 from the cavity 48 from a force of 150 Newtons or more. Hence, the retainer 14 and connector 12 can be relatively easily coupled in assembly, and remain solidly connected in normal use.

The retainer 14 can be made from any suitable material which may include, but is not limited to, various polymers. In one form, the retainer 14 is formed from a composite polyamide (nylon 6/6) and can withstand use in areas with elevated temperatures (e.g. engine compartments) without the need for additional heat shielding. One exemplary embodiment is suitable for use in temperatures up to 165° C.

While the forms of the invention herein disclosed constitute presently preferred embodiments, many others are possible. For example, while the connector was discussed as having a tapered, generally frusto-conical head, other connectors could be used including, for example, a connector having a partially spherical or ball-shaped head. Still other implementations are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A cable assembly, comprising:
a cable; and
a retainer releasably coupled to the cable and including a body with an axis, a cavity and a tip that defines an opening leading to the cavity, where the axis extends through the opening and the tip has a plurality of sections each with an inner surface spaced from the axis and defining a minimum effective size of the opening through which an object passes to reach the cavity, wherein the radial distance to the axis from the inner surface of at least one section varies along the circumferential extent of the inner surface of said at least one section wherein the retainer is constructed and arranged to mate with a connector having a reduced diameter portion and a head extending from the reduced diameter portion with at least a portion that is larger in diameter than the reduced diameter portion, wherein the retainer is adapted to receive the head within the cavity with the reduced diameter portion extending out of the cavity and into the opening, and when the head is received within the cavity, at least a portion of the inner surfaces of at least two diametrically opposed sections radially overlap the larger diameter portion of the head to retain the head within the cavity.

2. The cable assembly of claim 1 wherein the body includes at least one slot in the tip to define adjacent sections of the tip, each slot defines a corner on each of the inner surfaces of each adjacent section of the tip and each corner defines a maximum distance from the axis for its respective inner surface, and the opening is oriented in such a way that the corners do not radially overlap the head to the same extent as at least one other portion of the inner surfaces spaced from a corner.

3. The cable assembly of claim 2 wherein, in an inner surface that overlaps the head, the corners of that inner surface do not overlap the head.

4. The cable assembly of claim 1 wherein the tip is constructed and arranged so that the radial distance the sections must flex to permit the head to pass through the opening is not more than 175% of the maximum amount that the tip radially overlaps the head.

5. The cable assembly of claim 1 wherein the radial distance the sections must flex to permit the head to pass through the opening is between 100% to 150% of the maximum amount that the tip radially overlaps the head.

6. A cable assembly, comprising:
a cable; and
a retainer releasably coupled to the cable and including a body with an axis, a cavity and a tip that defines an opening leading to the cavity, where the axis extends through the opening and a slot is formed in the tip to define two sections of the tip, each section of the tip having an inner surface spaced from the axis with the inner surfaces defining a minimum size of the opening through which an object passes to reach the cavity where the cavity is larger than the minimum size of the opening, and wherein the distance to the axis from the inner surface of at least two sections of the tip varies along the circumferential length of the inner surfaces of each of said at least two sections, wherein the retainer is constructed and arranged to mate with a connector having a reduced diameter portion and a head extending from the reduced diameter portion with at least a portion that is larger in diameter than the reduced diameter portion, wherein the retainer is adapted to receive the head within the cavity with the reduced diameter portion extending out of the cavity and into the opening, and when the head is received within the cavity, at least a portion of the inner surfaces of at least two sections radially overlap the larger diameter portion of the head to retain the head within the cavity.

* * * * *